United States Patent [19]

Avny

[11] Patent Number: 5,720,595
[45] Date of Patent: Feb. 24, 1998

[54] COMPOSITE WHEEL AND METAL HUB FOR A TORQUE CONVERTER OR FLUID COUPLING

[75] Inventor: Eli Avny, Northville, Mich.

[73] Assignee: Ford Global Technologies, Inc., Dearborn, Mich.

[21] Appl. No.: 691,965

[22] Filed: Aug. 5, 1996

[51] Int. Cl.$^6$ .................................................. B63H 1/16
[52] U.S. Cl. ............... 416/180; 416/197 C; 416/213 R; 416/241 A; 416/244 R
[58] Field of Search ....................... 416/180, 197 C, 416/241 A, 244 R, 213 R, 213 A

[56] References Cited

U.S. PATENT DOCUMENTS

| | | |
|---|---|---|
| 3,386,244 | 6/1968 | Helmer . |
| 3,932,061 | 1/1976 | Scott ........................................ 416/213 |
| 4,479,735 | 10/1984 | Thompson et al. ................... 416/244 R |
| 4,605,355 | 8/1986 | Davis et al. .......................... 416/241 A |
| 4,957,414 | 9/1990 | Willingham . |
| 5,226,807 | 7/1993 | By et al. . |
| 5,358,382 | 10/1994 | Muhlbach . |
| 5,505,590 | 4/1996 | Döhring ................................. 416/180 |
| 5,507,622 | 4/1996 | Avny . |
| 5,518,368 | 5/1996 | Egert ..................................... 416/180 |

FOREIGN PATENT DOCUMENTS

| | | |
|---|---|---|
| 2361481 | 6/1974 | Germany . |
| 2449596 | 4/1976 | Germany . |

*Primary Examiner*—Thomas E. Denion
*Attorney, Agent, or Firm*—Frank G. McKenzie

[57] ABSTRACT

A turbine wheel for a torque converter for an automatic transmission is formed of fiber-reinforced plastic resin molded about a powder metal hub having a disc formed with corrugations extending radially from a central axis, and slots extending through the thickness of the disc at angularly spaced intervals. The plastic resin of the turbine wheel fills the spaces between the tabs, extends through the slots formed through the disc, and forms a bond to the surfaces of the disc on which it is molded.

11 Claims, 2 Drawing Sheets

COMPOSITE WHEEL AND METAL HUB FOR A TORQUE CONVERTER OR FLUID COUPLING

BACKGROUND OF THE INVENTION

1. Technical Field

This invention relates to the field of torque converters and fluid couplings for use in automatic transmissions for motor vehicles.

2. Description of the Prior Art

Conventionally, the turbine of a hydrokinetic torque converter comprises three components: a shell, vanes, and a shroud. In order to join these three components structurally, both the shell and shroud are slotted to receive through the slot tabs formed on the vanes. After the vane tabs are located within the shroud and shell, the tabs are bent or rolled over to form a mechanical attachment on the shroud that holds the vanes fixed in position. To facilitate automatic vane assembly, clearance must be provided between the slots and tabs. This clearance results in leakage of hydraulic fluid through the thickness of the shell and shroud, which leakage causes a substantial performance, operating efficiency, and fuel economy penalty. A turbine wheel formed of fiber-reinforced plastic resin composite material eliminates the need for slots through the shell and shroud thickness because the shell, vanes and shroud are molded integrally. Furthermore, a composite turbine wheel also eliminates the gap between the shell and vanes and offers potential for significant improvement in fuel economy. An additional advantage resides in the incorporation of an airfoil-shaped blade. U.S. Pat. No. 5,226,807 describes a turbine wheel of this type.

Loads carried by the turbine wheel are transmitted to an input shaft of the transmission through a spline connection. Use of a spline for this purpose requires that the hub of the turbine wheel be formed of metal and that it be part of the load path between the turbine and transmission input shaft. The turbine is subjected to axially directed loads, torsion, and radially directed centrifugal forces and thermally induced loads.

A rigid joint between a plastic turbine wheel and a metallic hub can cause significant difficulties. For example, the composite plastic material has a lower stiffness and strength in comparison to the strength and stiffness of the metallic hub. If the hub and turbine wheel are attached mutually by a rigid connection, they are required to deflect as a single structural member. Such a rigid attachment can induce high stresses into the composite material.

Another difficulty is associated with the substantially greater thermal expansion coefficient of the composite turbine wheel in comparison to that of a metal hub. Because of this, temperature within an operating torque converter, which may vary between −40° F. and 450° F., can cause large thermal stresses in the composite material.

U.S. Pat. No. 5,507,622, assigned to the assignee of this invention, discloses a bladed wheel of plastic molded integrally on a metal hub having a disc whose form addresses these difficulties.

SUMMARY OF THE INVENTION

This invention is applicable to a fluid coupling or torque converter that connects hydrodynamically a power source, such as an engine or motor, and planetary gearsets, which produce various output speeds of an automatic transmission. It includes a wheel comprising a hub adapted for driveable connection to the gearing preferably by engaging splines or another suitable mechanical connection. The hub is formed with a mounting surface, on which a disc is supported and connected to the hub. The disc includes a first leg directed along said axis and fixed to the mounting surface of the hub; and a second leg of relatively thin sheet connected to and directed radially and axially relative to the first leg, having first and second surfaces located on mutually opposite axially sides thereof and formed with corrugations thereon, the corrugations forming waves extending along the surface of the second leg about the axis, the waves defining crests and troughs directed substantially radially from said axis. A wheel includes a radially inner shell; a radially outer shroud surrounding and bonded to the first and second surfaces of the disc; and blades spaced mutually about said axis and fixed to the shell and shroud. The wheel, in the form of a partial torus, includes a flange surrounding and molded integrally with the disc, portions of the flange being located in slots formed in the disc.

BRIEF DESCRIPTION OF THE DRAWINGS

FIG. 4 is a cross section of the disc of FIG. 1 taken at plane 4—4.

DESCRIPTION OF THE PREFERRED EMBODIMENT

Figure 1:
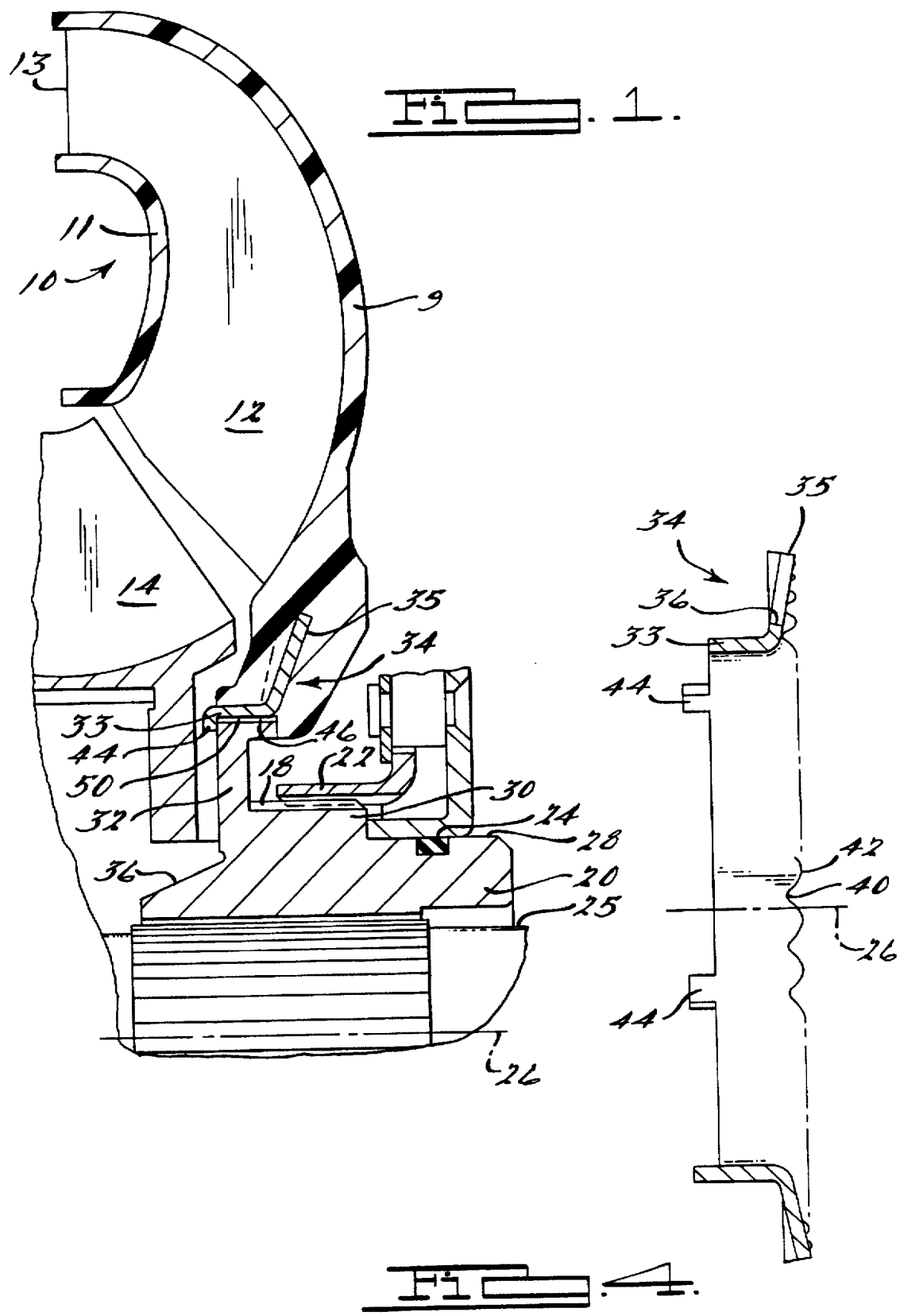
FIG. 1 is a partial cross section taken through a longitudinal plane of a turbine wheel for an automotive torque converter.

Referring first to FIG. 1, a hydrokinetic torque converter 10 includes a vaned or bladed impeller wheel connected to the crankshaft of an internal combustion engine. A turbine wheel 12 carries blades or vanes 13 spaced mutually about the torque converter axis. A vaned stator 14, the impeller, and turbine define a toroidal fluid flow circuit, whereby the impeller is hydrokinetically connected to the turbine. The stator 14 is supported rotatably on a stationary stator sleeve shaft, and an overrunning brake anchors the stator to the sleeve shaft to prevent rotation of the stator in the direction opposite the direction of rotation of the impeller, although free-wheeling motion in the opposite direction is permitted. The vaned turbine wheel 12 has the form of a partial torus, which, when assembled with the impeller and stator, forms a torus. The wheel includes an outer shroud 11 and inner shell 9, supporting vanes 13 at their radially outer peripheries, and an inner shell, supporting vanes 13 at their radially inner peripheries.

The torque converter 10 usually includes a lock-up clutch assembly located within the converter impeller housing, a portion of the clutch assembly being connected by a spline 18 formed on a flange 22 to a shoulder 30 of a metal turbine hub 20, the shoulder having an external spline adapted to receive the internal spline formed on the clutch assembly. An hydraulic seal 24, located in a recess formed on the turbine hub 20, prevents the passage of hydraulic fluid located within the impeller housing. The turbine hub 20 is connected, generally through a spline connection, to a shaft 25 having an axis aligned with the longitudinal axis 26 of the turbine wheel 12.

The turbine wheel may be formed of thermosetting or thermoplastic resin, preferably of injection molded, glass fiber-reinforced phenolic resin, preferably the material called phenolic MPC 7534, sold commercially by Rogers Corporation, Molding Materials Division, Manchester, Conn. A preferred alternative material is ASM Stanyl TW 241 F10, sold by Engineering Plastics, 2267 W. Mill Road, Evansville, Ind. Those skilled in the art will appreciate, in view of this disclosure, that other types of plastic materials could be used with a device according to the present invention.

The hub 20 is preferably formed of powdered metal, such as FC 5008-5D, sold by Chicago Powdered Metal Products Co., of Shiller Park, Ill. An acceptable alternative material from which the hub can be formed is stamped or forged steel.

The hub 20 includes or supports a cylindrical outer surface 28, in which a recess for the seal 24 is formed; a shoulder 30, on which the external spline is formed; a radially directed flange 32 extending outward from the shoulder; a conical disc 34 extending axially and radially from the radial extremity of flange 32; and a conical portion 36 facing the impeller wheel.

Figure 2:
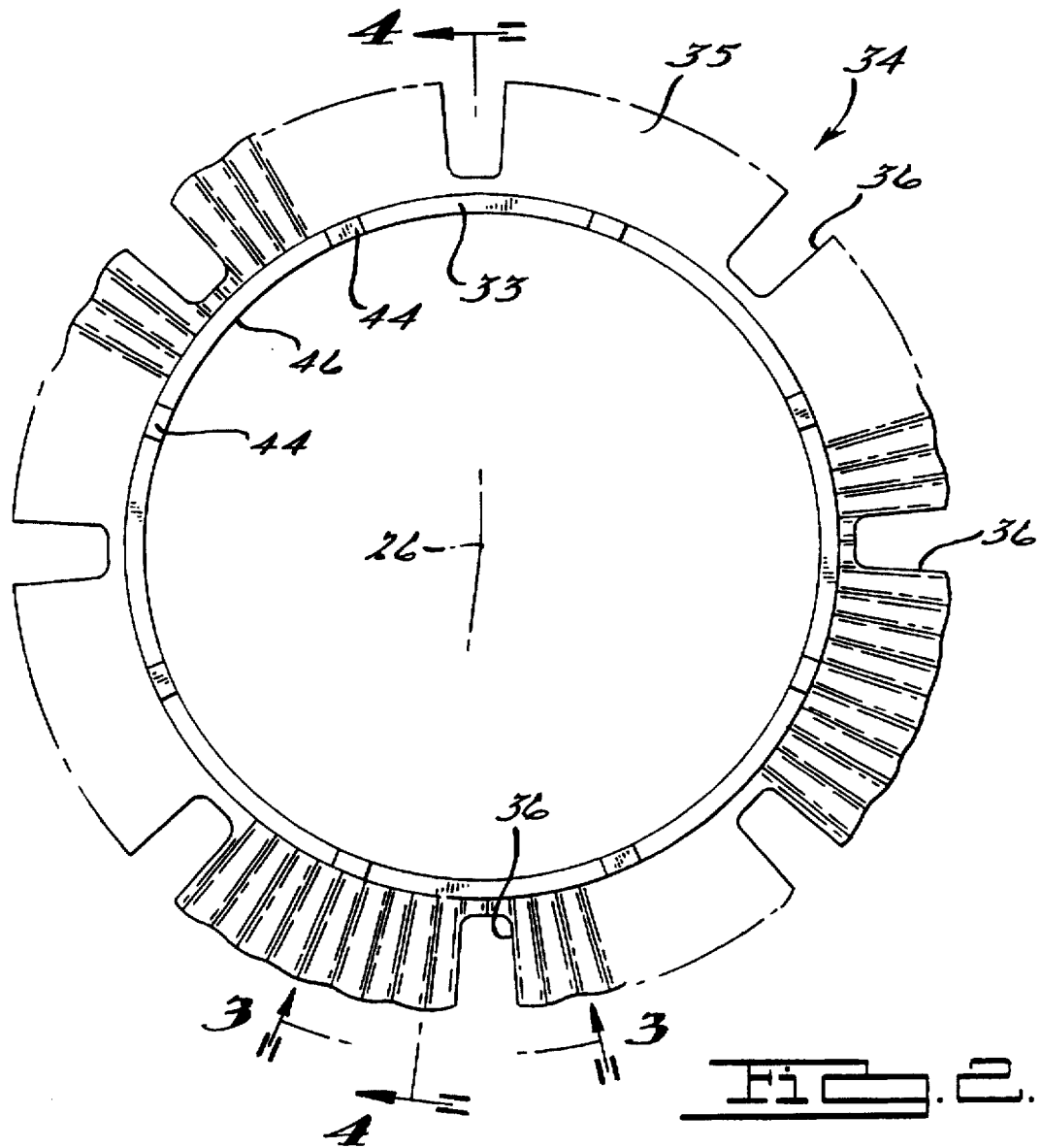
FIG. 2 is a side view of a disc of corrugated sheet metal.
Figure 3:
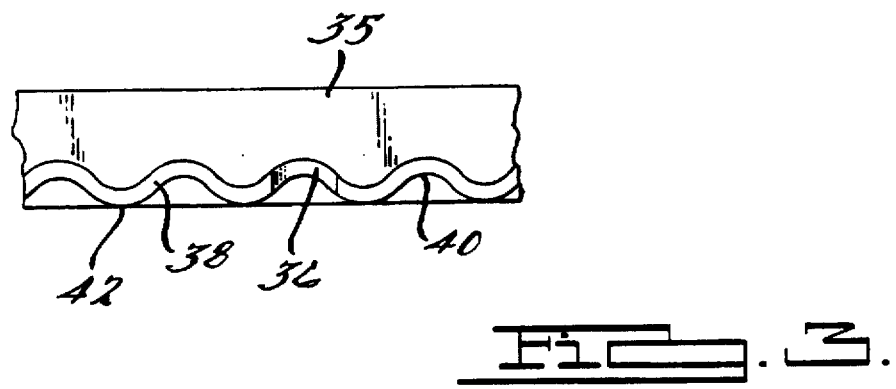
FIG. 3 is a top view of the disc of FIG. 2 taken in the range and direction of arrows 3—3.

Referring now to FIGS. 2 and 3, the radially directed flange 32 supports a conical disc 34, including a first leg 33 directed axially and a second leg 35 directed radially and axially relative to the first leg and formed with thin, corrugated sheet metal molded integrally with the turbine wheel 10. The disc is formed with eight angularly spaced, radially directed slots 36 that extend partially through the width of the disc. When the wheel 9 is molded integrally with the disc 34, plastic resin fills the slots, thereby improving resin flow to both sides of the disc during the molding process.

The plane of the disc is formed with corrugations or waves 38 extending around the disc and across its width. FIG. 3 shows that the height of the corrugations is greatest at the outer radial edge and is least at the inner radial edge. The crests 40 and troughs 42 of the corrugations are directed substantially radially.

Due to the use of thin sheet metal, the disc will conform to and deflect with the turbine wheel 9, which surrounds the axial surfaces and the radially outer surface of the disc. Located at the left axial end of leg 33, as seen best in FIG. 1, are angularly spaced, radially directed shoulders 44 that contact the adjacent surface of hub 20. Axial loads are transferred from turbine to the hub.

The radially inner surface 46 of the disc, which extends substantially axially, contacts the axially directed radially outer surface of flange 32 of the hub 20, which is formed with fine pitch spline teeth 50. The disc and hub are joined mutually by spline rolling to join the disc and hub into a one-piece assembly. During the spline rolling process, a large, inwardly directed radial force is applied to the radially outer surface of leg 33, thereby causing the metal of leg 33 to fill the spaces between the spline teeth 50 on the radially outer surface of disc 32.

The form of the invention shown and described herein constitutes the preferred embodiment of the invention; it is not intended to illustrate all possible forms thereof. The words used are words of description rather than of limitation, and various changes may be made from that which is described here without departing from the spirit and scope of the invention.

I claim:

1. An assembly for a fluid coupling or torque converter, comprising:

a hub surrounding a central axis, having a mounting surface thereon;

a disc including a first leg directed along said axis and fixed to the mounting surface of the hub, and a second leg of relatively thin sheet connected to and directed radially and axially relative to the first leg, having first and second surfaces located on mutually opposite axially sides thereof and formed with corrugations thereon, the corrugations forming waves extending along the surface of the second leg about said axis, the waves defining crests and troughs directed substantially radially from said axis;

a wheel including a radially outer shell, a radially inner shroud surrounding and integrally molded to the first and second surfaces of the disc, and blades spaced mutually about said axis and fixed to the shell and shroud.

2. The assembly of claim 1 wherein the hub is formed of metal, and further comprises:

an annular flange extending radially toward the disc, defining the mounting surface thereon; and means for driveably releasably connecting mutually the hub and a shaft directed parallel to said axis.

3. The assembly of claim 1 wherein:

the disc is formed of sheet metal, the second leg of the disc being in the form of a truncated cone having a width extending radially and axially from the first leg, having slots spaced mutually about said axis directed radially and axially relative to said axis and extending partially across said width, a portion of the wheel located in the slots.

4. The assembly of claim 1 wherein the hub is formed of powered metal and the disc is of sheet metal.

5. An assembly for a fluid coupling or torque converter, comprising:

a hub surrounding a central axis, having a mounting surface thereon;

a disc including a first leg directed along said axis and fixed to the mounting surface of the hub, and a second leg of relatively thin sheet connected to and directed radially and axially relative to the first leg, having first and second surfaces located on mutually opposite axially sides thereof and formed with corrugations thereon, the corrugations forming waves extending along the surface of the second leg about said axis, the waves defining crests and troughs directed substantially radially from said axis;

a wheel formed of plastic, molded integrally with the disc, the wheel including a radially outer shell, a radially inner shroud surrounding and integrally molded to the first and second surfaces of the disc, and blades spaced mutually about said axis and fixed to the shell and shroud.

6. The assembly of claim 5 wherein the hub is formed of metal, and further comprises:

an annular flange extending radially toward the disc, defining the mounting surface thereon; and means for driveably releasably connecting mutually the hub and a shaft directed parallel to said axis.

7. The assembly of claim 5 wherein the wheel is in the form of a partial torus, the outer shroud having a flange surrounding and integrally molded to the surfaces of the disc.

8. The assembly of claim 5 wherein:

the disc is formed of sheet metal, the second leg of the disc being in the form of a truncated cone having a thickness, a width extending radially and axially from the first leg, having slots spaced mutually about said axis directed radially and axially relative to said axis and extending partially across said width and through said thickness, a portion of the wheel located in each of said slots.

9. An assembly for a fluid coupling or torque converter, comprising:

a hub surrounding a central axis, having a mounting surface thereon;

a disc including
- a first leg directed along said axis and fixed to the mounting surface of the hub, and
- a second leg of relatively thin sheet in the form of a truncated cone having a thickness and a width extending radially and axially from the first leg, connected to the first leg, having slots spaced mutually about said axis directed radially and axially relative to said axis and extending partially across said width and through said thickness, a portion of the wheel located in each of said slots, having first and second surfaces located on mutually opposite axially sides thereof and formed with corrugations thereon, the corrugations forming waves extending along the surface of the second leg about said axis, the waves defining crests and troughs directed substantially radially from said axis;

a wheel formed of plastic, molded integrally with the disc, the wheel including
- a radially outer shell;
- a radially inner shroud surrounding and integrally molded to the first and second surfaces of the disc, and
- blades spaced mutually about said axis and fixed to the shell and shroud.

10. The assembly of claim 9 wherein the hub is formed of metal, and further comprises:

an annular flange extending radially toward the disc, defining the mounting surface thereon; and means for driveably releasably connecting mutually the hub and a shaft directed parallel to said axis.

11. The assembly of claim 9 wherein the wheel is in the form of a partial torus, the outer shroud having a flange surrounding and bonded to the surfaces of the disc.

* * * * *